(12) United States Patent
Chung (10) Patent No.: US 10,047,910 B2
(45) Date of Patent: Aug. 14, 2018

(54) APPARATUS FOR FASTENING GAS VESSEL AND MANUFACTURING METHOD OF THE SAME

(71) Applicant: HYUNDAI MOTOR COMPANY, Seoul (KR)

(72) Inventor: Jae Han Chung, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/377,250

(22) Filed: Dec. 13, 2016

(65) Prior Publication Data
US 2018/0003346 A1 Jan. 4, 2018

(30) Foreign Application Priority Data
Jul. 1, 2016 (KR) ........................ 10-2016-0083661

(51) Int. Cl.
*F16M 11/00* (2006.01)
*F17C 13/08* (2006.01)
(Continued)

(52) U.S. Cl.
CPC ............ *F17C 13/084* (2013.01); *B29C 65/48* (2013.01); *B29C 65/562* (2013.01); *B29C 66/532* (2013.01); *B29C 66/721* (2013.01); *B29C 70/30* (2013.01); *F16B 2/06* (2013.01); *F16B 2/08* (2013.01); *B29K 2105/06* (2013.01); *B29L 2031/712* (2013.01); *B29L 2031/727* (2013.01); *F17C 2205/0103* (2013.01); *F17C 2205/013* (2013.01); *F17C 2205/0157* (2013.01);
(Continued)

(58) Field of Classification Search
USPC ................................. 248/499, 510, 637, 671
See application file for complete search history.

(56) References Cited

U.S. PATENT DOCUMENTS 4,262,943 A * 4/1981 Armstrong .......... F01N 13/1805
24/277
4,305,508 A * 12/1981 Rodgers ............. B65D 19/0095
108/55.3
(Continued)

FOREIGN PATENT DOCUMENTS

CN 203438846 U 2/2014
JP 2000-343959 A 12/2000
(Continued)

OTHER PUBLICATIONS

Korean Office Action issued in Application No. 10-2016-0083661 dated Mar. 16, 2017.

*Primary Examiner* — Steven M Marsh
(74) *Attorney, Agent, or Firm* — McDermott Will & Emery LLP (57) ABSTRACT

An apparatus for fastening a pair of gas vessels includes: a plurality of first units formed of a composite material, spaced apart from each other in parallel with each other in a length direction of the gas vessel, and having the pair of gas vessels seated on both sides thereof; a second unit formed of a composite material and extending in the length direction of the gas vessels to integrally connect the plurality of first units; and a plurality of fastening units each of which extending along a circumference of the gas vessels to enclose the gas vessels seated on the first units and having both ends connected to the first units.

20 Claims, 8 Drawing Sheets (51) Int. Cl.
　　　*B29C 65/48*　　　(2006.01)
　　　*B29C 65/56*　　　(2006.01)
　　　*B29C 65/00*　　　(2006.01)
　　　*B29C 70/30*　　　(2006.01)
　　　*F16B 2/06*　　　(2006.01)
　　　*F16B 2/08*　　　(2006.01)
　　　*B29K 105/06*　　　(2006.01)
　　　*B29L 31/00*　　　(2006.01)

(52) U.S. Cl.
　　　CPC ............... *F17C 2209/2109* (2013.01); *F17C 2209/227* (2013.01); *F17C 2270/0168* (2013.01)

(56) References Cited

U.S. PATENT DOCUMENTS

| | | | | |
|---|---|---|---|---|
| 6,971,826 | B2* | 12/2005 | Valentine | B60P 7/12 410/104 |
| 7,137,474 | B2 | 11/2006 | Yokote | |
| 7,186,095 | B2* | 3/2007 | Skinner | F04B 39/12 248/677 |
| 7,244,084 | B2* | 7/2007 | Anthony | B60P 7/12 410/36 |
| 8,616,517 | B2* | 12/2013 | Huth | F01D 17/162 248/188.1 |
| 9,079,523 | B2* | 7/2015 | Morin | B60P 3/075 |

FOREIGN PATENT DOCUMENTS

| | | | |
|---|---|---|---|
| JP | 2002-528331 | A | 9/2002 |
| JP | 2009-101865 | A | 5/2009 |
| JP | 2010-175001 | A | 8/2010 |
| KR | 10-2001-0089360 | A | 10/2001 |
| KR | 10-2009-0001380 | A | 1/2009 |

* cited by examiner

FIG. 9

APPARATUS FOR FASTENING GAS VESSEL AND MANUFACTURING METHOD OF THE SAME

CROSS REFERENCE TO RELATED APPLICATION

The present application claims the benefit of priority to Korean Patent Application No. 10-2016-0083661, filed on Jul. 1, 2016, the entire content of which is incorporated herein for all purposes by this reference.

TECHNICAL FIELD

The present disclosure relates to an apparatus for fastening a gas vessel made of a composite material, and a manufacturing method for the same.

BACKGROUND

An alternative fuel gas vehicle that has recently come into the limelight requires a gas vessel for storing high pressure fuel gas. The gas vessel is mounted on a fastening frame to be fastened to a vehicle body. A gas vessel fastening frame includes a mounting band for restricting a motion of a tank and a frame for mounting the mounting band. A mounting method is divided into a belly mounting fastening a body part of the gas vessel and a neck mounting fastening a boss part of the gas vessel.

The mounting band is made of a thin, flexible metal material, and the fastening frame is also manufactured by performing plastic working on members of metal materials having high rigidity and then coupling these members by bolt assembling or welding. The form and size of the fastening frame have been variously applied according to specifications of the vessel and a coupling scheme with the vehicle. However, the fastening frame made of the metal materials is cheap and easily processed, but is heavy, and therefore, is not suitable for vehicles requiring weight reduction like eco-friendly vehicles. Therefore, a fastening frame made of a composite material may be an alternative plan, but may be expensive over metal and may have reduced moldability.

The present, disclosure proposes an optimal shape of the fastening frame for the gas vessel using properties of a fiber reinforcing composite material, thereby proposing a structure that may realize low price while achieving integration and weight reduction of the fastening frame.

The matters described as the related art have been provided only for assisting in the understanding for the background of the present disclosure and should not be considered as corresponding to the related art known to those skilled in the art.

SUMMARY

An object of the present disclosure is to provide an apparatus for fastening a gas vessel including first units and a second unit in an integrated frame form of a composite material.

According to an exemplary embodiment of the present disclosure, an apparatus for fastening a pair of gas vessels includes: a plurality of first units formed of a composite material, spaced apart from each other in parallel with each other in a length direction of the gas vessels, and having the pair of gas vessels seated on both sides thereof; a second unit formed of a composite material, and extending in the length direction of the gas vessels to integrally connect the plurality of first units; and a plurality of fastening units each of which extending along a circumference of the gas vessel to enclose the gas vessels seated on the first unit and have both ends connected to the first units.

Each of the plurality of first units may be divided into a upper receiving part in which the pair of gas vessels are seated on both sides thereof and a lower support part of supporting the receiving part at a lower portion thereof, and a closed curve may be formed between the receiving part and the support part.

The second unit may be fastened between the receiving part and the support part to bisect the closed curve.

A thickness of the support part may be thicker than that of the receiving part or a stiffness of the reinforcing fiber forming the support part may be higher than that of the reinforcing fiber forming the receiving part.

Each of the first units may include: a pair of receiving regions located at both sides thereof and having the gas vessels seated on each thereof to enclose the lower portions of the gas vessels; a connection region located between the pair of receiving regions; a pair of protruding regions protruding outwardly from each of the receiving regions; a pair of descending regions extending downwardly from each of the protruding regions; and a support region extending to connect the descending region of one side thereof and the descending region of another side thereof.

The receiving regions may be spaced upwardly from the support region.

A central part of the support region located under the connection region may protrude upwardly toward the connection region.

The second unit may be fastened between the support region and the connection region to connect the plurality of first units.

One end of each of the fastening units may penetrate through the protruding region and the support region and another end thereof may penetrate through the connection region, the second unit, and the support region.

A center of both side portions of the support region located under the pair of receiving regions may protrude upwardly so that a cross sectional shape thereof is bent.

The protruding region may be connected to a vehicle body and an insertion plate may be inserted into the protruding region.

Each of the fastening units may include: a fastening band extending along the circumference of the gas vessels to enclose an upper portion of the gas vessels; a through bar disposed at both ends of the fastening band and penetrate through the first units; and an absorbing part formed at an end of the through bar penetrating through the first units and absorbing deformation due to the expansion and contraction of the gas vessels.

The absorbing part may include: a spring member inserted into the through bar penetrating through the first units and a fastening member fastened to the end of the through bar.

The absorbing part may further include: a washer inserted into the through bar to be disposed at an upper portion or lower portion of the spring member.

The apparatus may further include: a first rubber band disposed between the first units and the gas vessels; and a second rubber band disposed between the fastening units and the gas vessels and enclose the circumference of the gas vessels along with the first rubber band.

The second unit may have a hollow shape so that the cross section thereof vertically cut in the length direction of the gas vessels forms a closed cross section.

The closed cross section may have a rectangular shape in which a height is longer than a width.

According to another exemplary embodiment of the present disclosure, a manufacturing method of an apparatus for fastening a pair of gas vessels includes; an all molding step of molding a plurality of first units having a pair of gas vessels seated on both sides thereof using a mold or a foam using a reinforcing fiber and a resin and a second unit which extends in a length direction of the gas vessels; a bonding step of integrally connecting the plurality of first units which are spaced apart from each other in parallel with each other in the length direction of the gas vessels to the second unit using an adhesive; and a fastening step of fastening the gas vessels to the first units after the pair of gas vessels are seated on the first units.

In the all molding step, when the reinforcing fiber is stacked in the mold or on the foam, the reinforcing fiber may be stacked so that an align direction of the reinforcing fiber of the first units is vertical to the length direction of the gas vessels and the reinforcing fiber may be stacked so that an align direction of the reinforcing fiber of the second unit is parallel with the length direction of the gas vessels.

In the all molding step, when the reinforcing fiber is stacked in the mold or on the foam, the reinforcing fiber may be disposed so that a fabric is disposed on the surfaces of the first units and the second unit.

According to still another exemplary embodiment of the present invention, there is provided a manufacturing method of an apparatus for fastening a pair of gas vessels, including: a partial molding step of molding a second unit extending in a length direction of the gas vessel using a mold or a foam using a reinforcing fiber and a resin; an integral molding step of integrally molding the first units and the second unit by simultaneously molding the plurality of first units spaced apart from each other in parallel with each other in a length direction of the gas vessel using the mold or the foam using the reinforcing fiber and the resin and disposing the second unit in the mold; and a fastening step of fastening the gas vessel to the first unit after the pair of gas vessels are seated on the first units.

DETAILED DESCRIPTION OF THE EXEMPLARY EMBODIMENTS

Hereinafter, exemplary embodiments of the present invention will be described with reference to the accompanying drawings.

Figure 1:
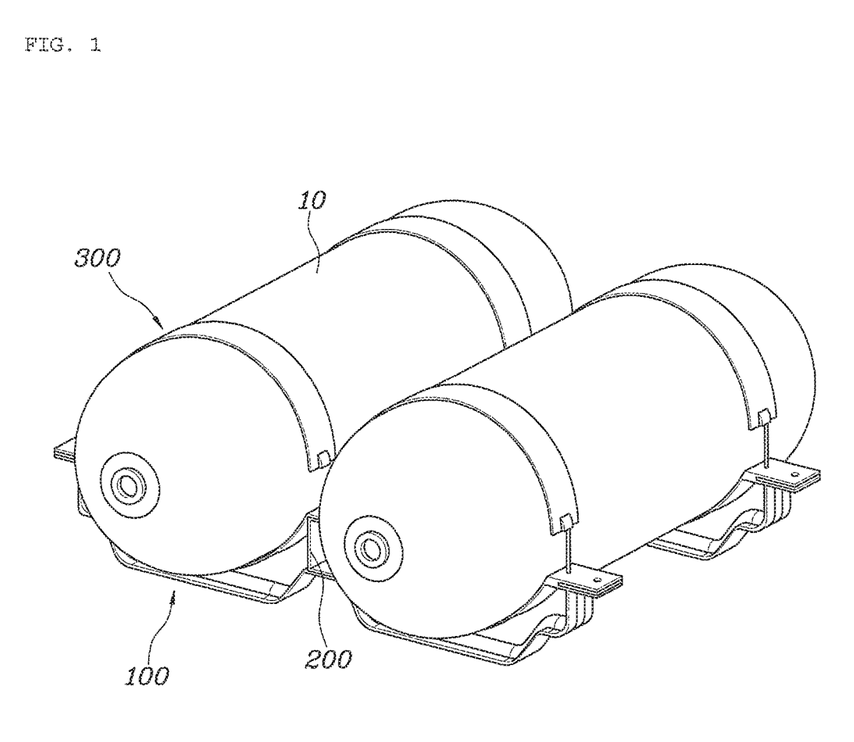
FIG. 1 is a diagram illustrating an apparatus for fastening a gas vessel according to an exemplary embodiment of the present disclosure.

As illustrated FIG. 1, an apparatus for fastening a pair of gas vessels 10 according to an exemplary embodiment of the present disclosure includes: a plurality of first units 100 made of a composite material, spaced apart from each other in parallel with each other in a length direction of the gas vessel 10, and having the pair of gas vessels 10 seated on both sides thereof; a second unit 200 made of a composite material and extending in a length direction of the gas vessel 10 to integrally connect the plurality of first units 100 that are spaced apart from each other; and a plurality of fastening units 300 each extending along a circumference of the gas vessel 10 to enclose the gas vessel 10 seated on the first units 100 and having both ends connected to the first units 100.

The gas vessel 10 is a vessel in which high pressure fuel gas is stored and may be a gas vessel 10 used for a fuel cell vehicle or a compressed natural gas vehicle.

The gas vessel 10 for a vehicle may have a cylindrical body shape, dome-shaped curved portions at both ends of the body, and bosses at distal ends of the curved portions. In this case, the length direction of the gas vessel 10 means a direction extending from the curved portion of one end to the curved portion of another end.

Figure 2:
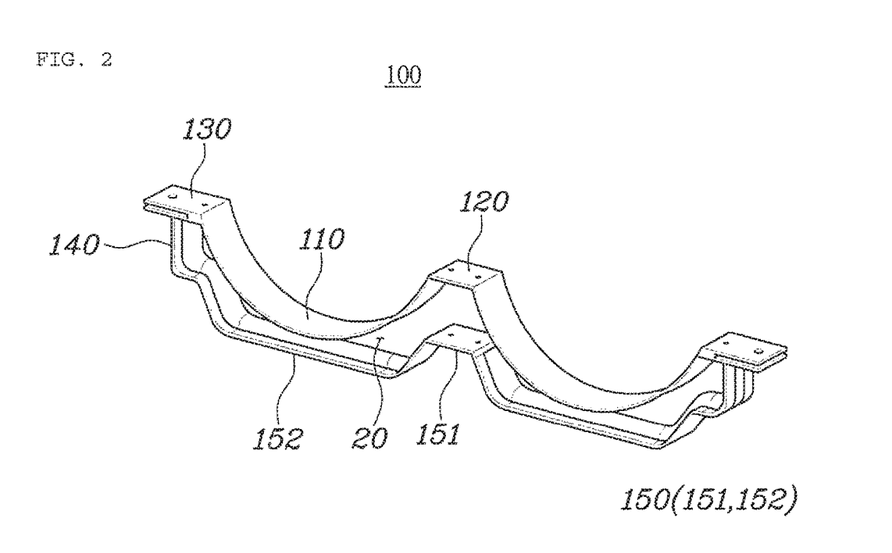
FIG. 2 is a diagram illustrating first units according to an exemplary embodiment of the present disclosure.

As illustrated in FIG. 2, a first unit 100 has a shape indented downwardly so that the pair of gas vessels 10 may be seated on both sides thereof. The indented shape may be formed to be equal to a curvature of a surface of the gas vessel 10, and thus, the gas vessel 10 may be stably seated on the first unit 100. In the case of the gas vessel 10 for a vehicle, the indented shape may be formed to be equal to a curvature of the cylindrical body.

Further, the first unit 100 may be provided in plural. The first unit 100 may be provided in two. Here, the gas vessels 10 may be seated on the first units 100 so that one first unit 100 receives a front portion of the gas vessel 10 and the other first unit 100 receives a rear portion of the gas vessel 10.

The first unit 100 is made of a composite material. The composite material includes a reinforcing fiber and a resin, in which the reinforcing fiber may include at least one selected from a carbon fiber, an aramid fiber, a glass fiber, and a natural fiber and the resin may include at least one selected from a thermosetting resin and a thermoplastic resin. However, they are not limited thereto.

Figure 3:
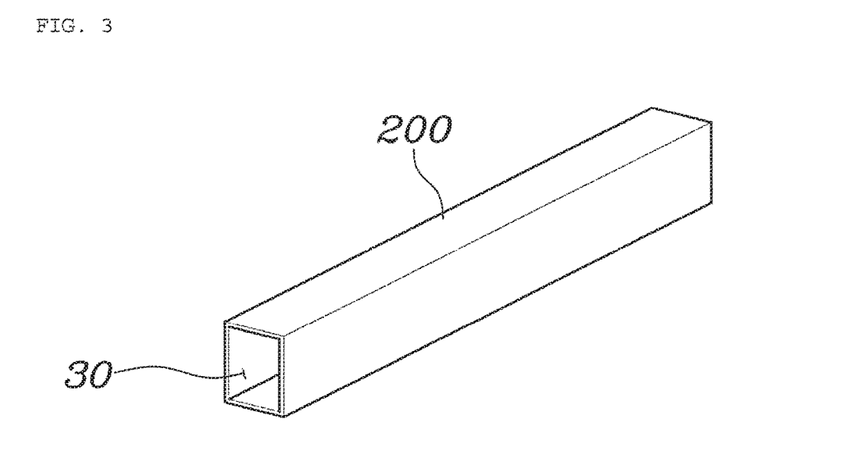
FIG. 3 is a diagram illustrating a second unit according to an exemplary embodiment of the present disclosure.

As illustrated in FIG. 3, the second unit 200 extends along the length direction of the gas vessel 10. Therefore, the second unit 200 may connect the plurality of first units 100 which are spaced apart from each other in parallel with the length direction of the gas vessel 10. As illustrated in FIG. 3, when the first unit 100 is provided in two, one of first units 100 may be connected to a front portion of the second unit 200 and the other first unit 100 may be connected to a rear portion of the second unit 200.

Similar to the first unit 100, the second unit 200 is made of a composite material. The composite material includes the reinforcing fiber and the resin, in which the reinforcing fiber may include at least one selected from a carbon fiber, an aramid fiber, a glass fiber, and a natural fiber and the resin may include at least one selected from a thermosetting resin and a thermoplastic resin. However, they are not limited thereto.

A fastening unit 300 has both ends connected to the first unit 100 and encloses an upper portion of the gas vessel 10 seated on the first unit 100 in the form in which it extends along the circumference of the gas vessel 10 from one end connected to the first unit 100 to have the other end connected to the first unit 100. Accordingly, the gas vessel 10 is fastened to the first unit 100. Since each gas vessel 10 seated on the first unit 100 is fastened, when the first unit 100 is provided in two, the fastening unit 300 is provided in a total of four.

As described above, the apparatus for fastening a gas vessel has a frame structure in which the plurality of first units 100 and the second unit 200 connecting therebetween are integrated, and thus may be attached and detached as one module, thereby expecting the effect of improving of workability.

Further, as the first unit 100 and the second unit 200 are made of the composite material, it may expect the effect of achieving weight reduction and improving corrosion resistance. Therefore, when the apparatus for fastening a gas vessel is applied to the vehicle, it is possible to improve fuel efficiency.

Referring to FIG. 2, the first unit 100 is divided into a receiving part in which the pair of gas vessels 100 are seated on both sides thereof and a support part of supporting the receiving part at the lower portion thereof, in which a closed curve 20 may be formed between the receiving part and the support part.

Further, the second unit 200 may be fastened between the receiving part and the support part to bisect the closed curve 20.

The receiving part is a part that is formed at an upper portion of the first unit 100 so that the gas vessel 10 can be seated thereon and may correspond to the curvature formed on the surface of the gas vessel 10 to receive the gas vessel 10. Since the first unit 100 has the pair of gas vessels 10 seated on both sides thereof, the receiving part has the parts, which may receive the gas vessel 10, provided at both sides thereof.

The support part is formed at the lower portion of the first unit 100 to support the receiving part, on which the gas vessel 10 is seated, at the lower portion thereof. The support part and the receiving part have the form in which both side portions are connected to each other and central portions are spaced apart from each other. Therefore, the closed curve 20 is formed between the receiving part and the support part.

Since the second unit 200 is fastened between the receiving part and the support part, the closed curve 20 is bisected by the second unit 200 and the bisected closed curve 20 is located at the lower portion of the pair of gas vessels 10. As such, the closed curve 20 formed by the upper receiving part and the lower support part is located under the gas vessel 10, such that the movement of the receiving part in response to a change in volume when the gas vessel 10 is expanded or contracted is free.

The receiving part and the support part of the first unit 100 perform different functions, in which the receiving part receives the gas vessel 10 and absorbs the deformation of the gas vessel 10, and the support part supports bending load.

A thickness of the support part may be thicker than that of the receiving part or the stiffness of the reinforcing fiber forming the support part may be higher than that of the reinforcing fiber forming the receiving part.

The thickness the support part is thicker than that of the receiving part, and thus, stiffness of the support part may be relatively higher than that of the receiving part. Even though the first unit 100 has an integrated structure, since different load conditions are applied to the upper and lower portions thereof, this is to make the upper and lower portions of the first unit 100 correspond to the different load conditions.

Further, the stiffness of the receiving part is lower than that of the support part and thus the receiving part may partially absorb the expansion of the gas vessel 10. Therefore, the first unit 100 forming the closed curve 20 absorbs the deformation of the gas vessel 10 in response to the expansion of the gas vessel 10 while supporting the load of the seated gas vessel 10.

That is, the reason why the stiffness of the support part is higher than that of the receiving part is to enable the receiving part to partially absorb the expansion of the gas vessel 10 and the support part to bear the load of the gas vessel 10. Therefore, it is possible to make the stiffness of the support part be higher than that of the receiving part by using materials having physical properties that make the stiffness (modulus of elasticity) of the reinforcing fiber injected into the receiving part be relatively lower than that of the reinforcing fiber injected into the support part.

When dividing the first unit 100 into each region, as illustrated in FIG. 2, the first unit 100 may include: a pair of receiving regions 110 located at both sides thereof and having the gas vessels 10 seated on each thereof to enclose the lower portions of the gas vessels 10; a connection region 120 located between the pair of receiving regions 110; a pair of protruding regions 130 protruding outwardly from each of the receiving regions 110; a pair of descending regions 140 extending downwardly from each of the protruding regions 130; and a support region 150 extending to connect the descending regions 140 of one side thereof and the descending regions 140 of the other side thereof.

As described above, the first unit 100 may be divided into the upper and lower portions and has the integrated structure in which the closed curve 20 is formed between the upper and lower portions. Dividing this in more detail, the receiving region 110 is a region formed so that the gas vessel 10 may be seated and is present at both sides thereof in pair.

The portion of the receiving region 110 in which the gas vessel 10 is received may receive the gas vessel 10 from the bottom portion of the gas vessel 10 to a height reaching about ⅓ of the gas vessel 10.

The connection region 120 is a portion connecting between the pair of receiving regions 110, and may provide a location where the second unit 200 is fastened.

The protruding region 130 is a portion outwardly extending from the pair of receiving regions 110. Here, the outside direction means a direction opposite to the direction in which the connection region 120 extends. The protruding region 130 is a portion that may be fastened to the vehicle body and includes a hole vertically penetrating and fastened to the vehicle body through the hole by a fastening tool. A descending region 140 is a portion that extends downwardly from the protruding region 130. The support region 150 is a region supporting the upper portion of the first unit 100 at the lower portion and connects between a pair of descending regions 140 of both sides thereof.

The receiving regions 110 may be spaced upwardly from the support region 150. The receiving region 110 is spaced upwardly from the support region 150 and the support region 150 is connected to the protruding region 130 outside the receiving region 110 via the descending region 140, such that the closed curve 20 may be formed in the first unit 100.

Further, a central part 151 of the support region 150 located under the connection region 120 may protrude upwardly toward the connection region 120. When the fastening unit 300 is connected to the first unit 100 in a manner that it penetrates through the first unit 100, the central portion 151 of the support region 150 protrudes upwardly, and thus, a space is formed at the lower portion of the support region 150 of the first unit 100. By the space, the fastening means, or the like connecting between the fastening unit 300 and the first unit 100 may be located.

Figure 4:
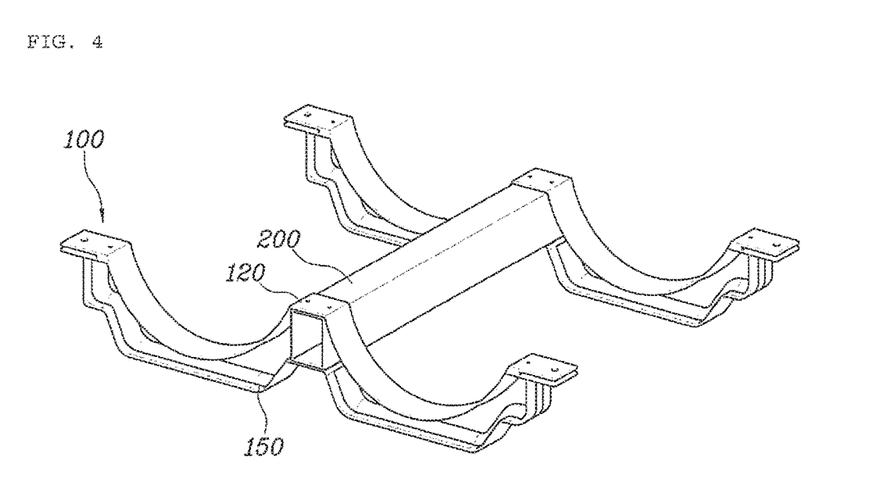
FIG. 4 is a diagram illustrating the first units and the second unit according to an exemplary embodiment of the present disclosure.

The second unit 200 may be fastened between the support region 150 and the connection region 120 to connect the plurality of first units 100. The second unit 200 that integrally connects between the plurality of first units 100 is fastened to the first unit 100 in such a manner that an upper surface thereof contacts a lower surface of the connection region 120 and a lower surface thereof contacts an upper surface of the support region 150, and thus, is connected to a center of the first unit 100. Therefore, a distance of the connection region 120 upwardly from the support region 150 shall correspond to a height of the second unit 200.

Figure 6:
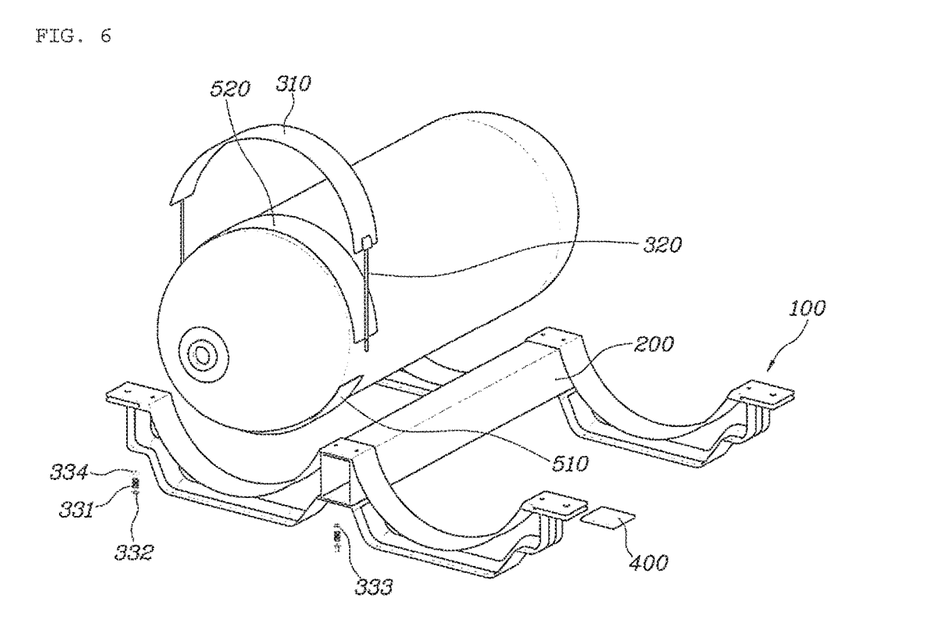
FIG. 6 is a diagram illustrating a coupling relationship among the first units, the second unit, the gas vessel, and a fastening unit according to the exemplary embodiment of the present disclosure.

One end of the fastening unit 300 may simultaneously penetrate through the protruding region 130 and the support region 150 and the other end thereof may simultaneously penetrate through the connection region 120, the second unit 200, and the support region 150.

The fastening unit 300 encloses the upper portion of the gas vessel 10 seated on the first unit 100 to fasten the gas vessel 10 to the first unit 100. One end of the fastening unit 300 may be connected to the first unit 100 in a shape in which it penetrates through the protruding region 130 and the support region 150 from a side portion and protrudes toward the lower portion of the support region 150 and another end thereof may be connected to the first unit 100 in a shape in which it penetrates through the connection region 120 and the support region 150 and protrudes toward the lower portion of the support region 150. The portions protruding toward the lower portions of each of the protruding regions 130 may be fastened by the fastening means.

The center of both side portions 152 of the support region 150 located under the pair of receiving regions 110 may protrude upwardly so that a cross sectional shape thereof is bent. As described above, since different load conditions are applied to the upper and lower portions of the first unit 100, a moment of inertia is increased due to the shape in which the center of the support region 150 serving to bear the bending load protrudes upwardly so that the cross section of the support region 150 is bent, thereby preventing the first unit from being bent and sagged in a horizontal direction due to the weight of the gas vessel 10.

The protruding region 130 may be connected to the vehicle body and an insertion plate 400 may be inserted into the protruding region 130. As described above, the protruding region 130 is the portion that may be connected to the vehicle body and the insertion plate 400 made of a metal material or a plastic material is inserted into the protruding region 130, thereby increasing the strength and stiffness of the coupled portion.

A length of the insertion plate 400 parallel with the direction protruding toward the outside of the protruding region 130 may be longer than the protruding length of the protruding region 130. Therefore, it is possible to prevent the bending of the protruding region 130 from being broken.

When the reinforcing fiber configuring the composite material includes the carbon fiber and the insertion plate 400 is made of the metal material, a potential corrosion may occur at a portion where the protruding region 130 and the insertion plate 400 contact each other due to a potential difference, and therefore, a surface of the insertion plate 400 is coated and film treated, thereby avoiding the direct contact between the protruding region 130 and the insertion plate 400.

Figure 5:
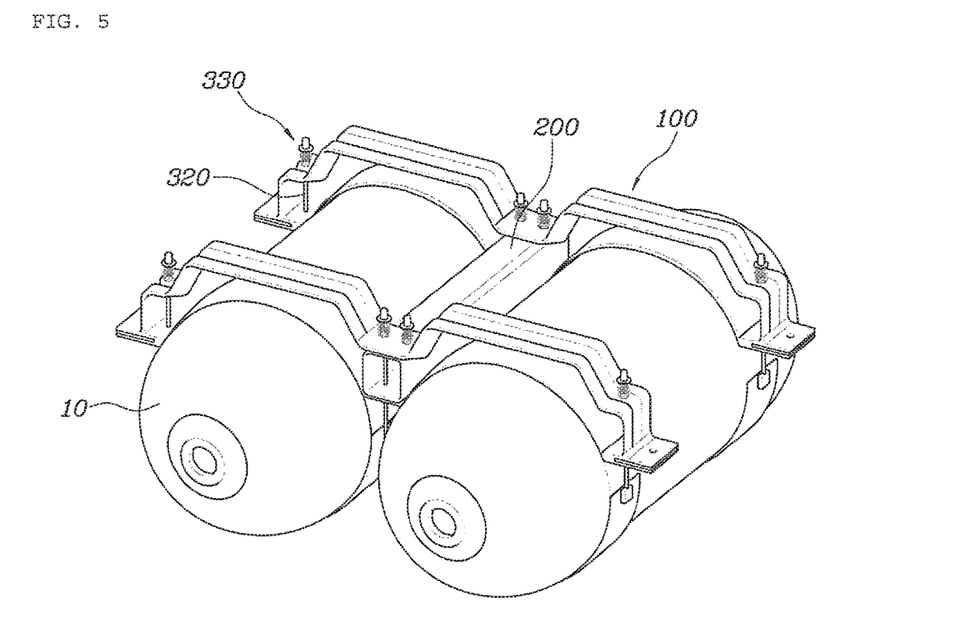
FIG. 5 is a diagram illustrating a lower portion of an apparatus for fastening a gas vessel according to an exemplary embodiment of the present disclosure.
Figure 7:
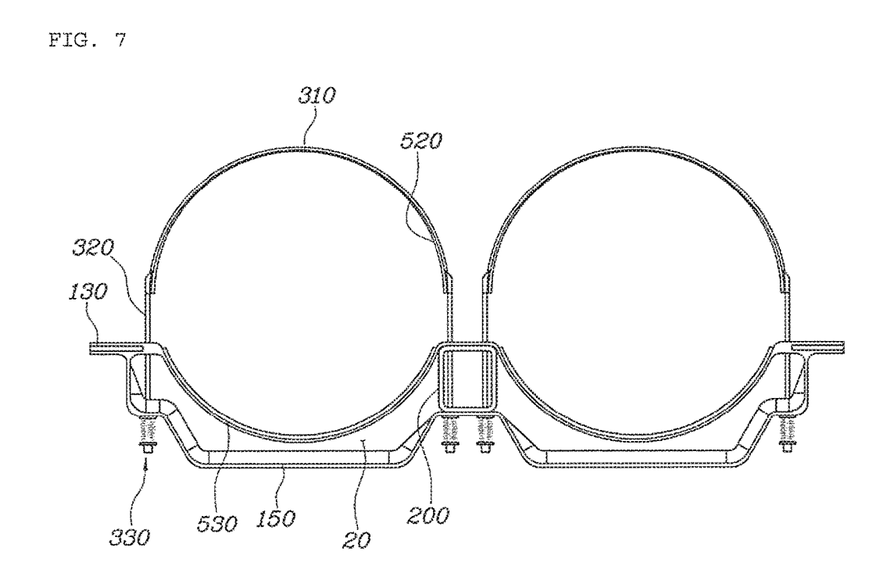
FIG. 7 is a front view of an apparatus for fastening a gas vessel according to an exemplary embodiment of the present disclosure.

As illustrated in FIGS. 5 to 7, the fastening unit 300 may include: a fastening band 310 extending along the circumference of the gas vessel 10 to enclose the upper portion of the gas vessel 10; through bars 320 provided at both ends of the fastening band 310 and penetrating through the first unit 100; and an absorbing part 330 formed at an end of the through bars 320 penetrating through the first unit 100 and provided to absorb the deformation due to the expansion and contraction of the gas vessel 10.

The fastening band 310 has a band shape made of the metal materials such as steel, aluminum alloy, and magnesium alloy and has a shape in which it extends along the circumference of the gas vessel 10. In a certain embodiment, the fastening band 310 may enclose the gas vessel 10 from the top end of the gas vessel 10 to a portion reaching ½ from the bottom.

The through bars 320 have a straight bar shape and are provided at both ends of the fastening band 310 and penetrates through the first unit 100. As described above, when the first unit 100 is divided into the receiving region 110, the connection region 120, the protruding region 130, the descending region 140, and the support region 150 and the second region 200 is disposed between the connection region 120 and the support region 150, a through bar 320 connected to one end of the fastening band 310 simultaneously penetrates through the protruding region 130 and the support region 150 and then the end of the through bar 320 protrudes downwardly of the support region 150, and the through bar 320 connected to another end of the fastening band 310 simultaneously penetrates through the connection region 120, the second unit 200, and the support region 150 and then the end of the through bar 320 may protrude to the lower portion of the support region 150.

The protruding end of the through bar 320 is connected to the absorbing part 330, in which the absorbing part 330 may absorb the deformation to cope with the deformation due to the expansion and contraction of the gas vessel 10 in the state in which the fastening band 310 and the through bar 320 are connected to the first unit 100.

Figure 8:
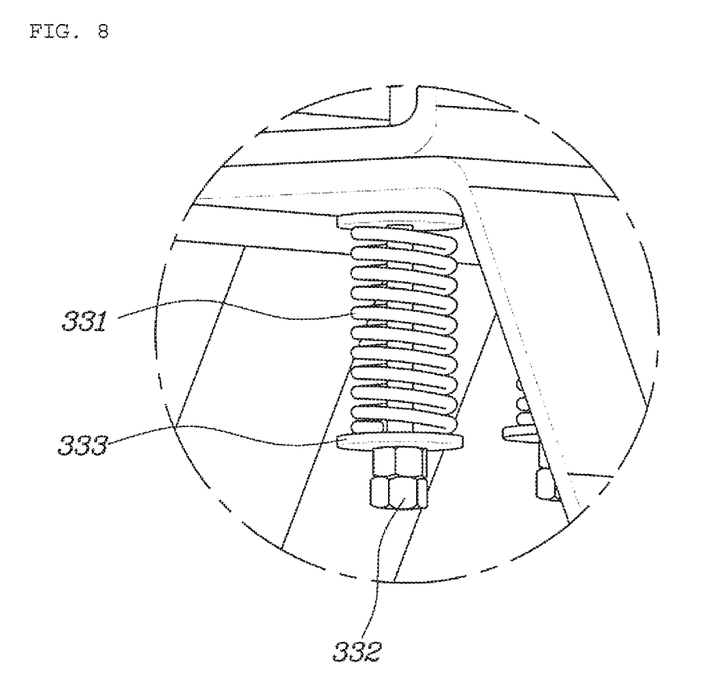
FIG. 8 is an enlarged view of an absorbing part according to an exemplary embodiment of the present disclosure.

Describing in detail, as illustrated in FIG. 8, the absorbing part 330 may include a spring member 331 inserted into the through bar 320 penetrating through the first unit 100 and a fastening member 332 fastened to the end of the through bar 320.

The spring member 331 is a core component that enables the absorbing part 330 to absorb the deformation of the gas vessel 10 and may absorb the deformation due to the expansion and contraction of the gas vessel 10 as much as a variable amount of the spring member 331 and since the pair of spring members 331 are inserted into the through bars 320 of both ends of the fastening band 310, the deformation may be doubled.

Further, when the gas vessel 10 is expanded and then contracted, the fastening unit 300 may also return to an original location again by the elastic force of the spring member 331.

As described above, for the spring member 331 to absorb the deformation in the state in which it is inserted into the through bar 320, the end of the through bar 320 is fastened to the fastening member 332. In a certain embodiment, the fastening member 332 may be a spring nut and a compressive force and a restoring force of the spring member 331 may be controlled to some degree by a fastening amount of the spring nut.

Further, the absorbing part 330 may further include the washer 333 inserted into the through bar 320 to be disposed at the upper portion or the lower portion of the spring member 331, in which the washer 333 helps to smoothly perform a compression and restoration and an expansion and restoration of the spring member 331 in the state in which it is inserted into the through bar 320.

As described above, the first unit 100 is divided into the receiving region 110, the connection region 120, the protruding region 130, the descending region 140, and the support region 150 and when the center of the both side portions 152 of the support region 150 protrudes upwardly so that the cross sectional shape thereof is bent, the inside of the protruding portion may be provided with a spacer 334 having a shape corresponding to the cross sectional shape.

The apparatus for fastening a gas vessel according to the exemplary embodiment of the present invention may further include a first rubber band 510 disposed between the first unit 100 an the gas vessel 10 and a second rubber band 520 disposed between the fastening unit 300 and the gas vessel 10 and enclosing the circumference of the gas vessel 10 along with the first rubber band 510.

The first rubber band 510 prevents the direct contact of the first unit 100 and the gas vessel 10 and the second rubber band 520 prevents the direct contact of the fastening unit 300 and the gas vessel 10. Therefore, when the gas vessel 10 is expanded and contracted, the first rubber band 510 and the second rubber band 520 prevent a friction from occurring between the first unit 100 and the gas vessel 10 or the fastening unit 300 and the gas vessel 10. The first rubber band 510 and the second rubber band 520 are made of an elastic material and thus may be stretched together when the gas vessel 10 is expanded.

As illustrated in FIG. 3, the second unit 200 may have a hollow shape so that the cross section thereof vertically cut in the length direction forms a closed cross section 30. The closed cross section 30 may have a rectangular shape in which the height is longer than a width.

The second unit 200 may have a hollow shape so that the cross section thereof is the closed cross section 30 and the shape of the closed cross section 30 may be a rectangle and the second unit 200 may be formed in a beam shape. As a result, it is possible to implement the weight reduction and in the case of the rectangle, a vertical height is longer than a length of the width, and thus it is possible to effectively cope with the bending load in the longitudinal direction.

Figure 9:
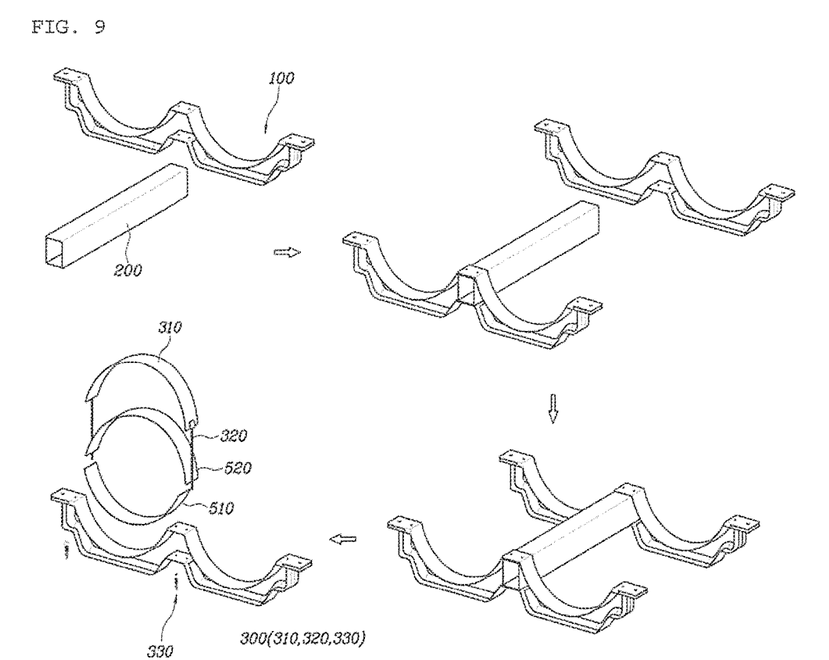
FIG. 9 is a diagram illustrating a manufacturing method of an apparatus for fastening a gas vessel according to an exemplary embodiment of the present disclosure.

As illustrated in FIG. 9, manufacturing method of an apparatus for fastening a pair of gas vessels 10 according to an exemplary embodiment of the present disclosure may include an all molding step of molding a plurality of first units 100 having a pair of gas vessels 10 seated on both sides thereof using a mold or a foam using a reinforcing fiber and a resin and a second unit 200 extending in a length direction of the gas vessel 10; a bonding step of integrally connecting the plurality of first units 100 spaced apart from each other in parallel with each other in the length direction of the gas vessel 10 to the second unit 200 using an adhesive; and a fastening step of fastening the gas vessel 10 to the unit 100 after the pair of gas vessels 10 are seated on the first unit 100.

In the all molding step, the first unit 100 and the second unit 200 are molded using the reinforcing fiber and the resin. In this case, the reinforcing fiber and the resin are prepared in a prepreg form to stack the prepreg and the first unit 100 and the second unit 200 may be molded using an autoclave or compression molding process.

Alternatively, the first unit 100 and the second unit 200 may be molded by the reinforcing fiber as a preform made of a fiber fabric or a non crimp fabric (NCF) and a vacuum molding scheme using the preform. In a certain embodiment, to increase the strength and the stiffness, the insertion plate 400 may be integrally molded while being inserted into the mold when the first unit 100 is molded.

Since the cross sectional shape may be the same, a pultrusion technology may be applied to the second unit 200. Therefore, productivity may be improved and manufacturing costs may be saved.

To increase the whole stiffness of the first unit 100 and the second unit 200, the first and second units may be molded using the foam. In this case, the reinforcing fiber may be directly stacked on the foam, and therefore, production efficiency may be increased.

When the first unit 100 and the second unit 200 are molded by the all molding step, the plurality of first units 100 may be connected to the second unit 200 by the bonding step. Next, the manufacturing method of an apparatus for fastening a gas vessel 10 is completed by the fastening step of fastening the gas vessel 10 to the first unit 100 after the pair of gas vessels 10 are seated on the first unit 100.

In a certain embodiment, the means for fastening a gas vessel 10 may include: the fastening band 310 extending along the circumference of the gas vessel 10 to enclose the upper portion of the gas vessel 10; the through bar 320 provided at both ends of the fastening band 310 and penetrating through the first unit 100; and the absorbing part 330 formed at the end of the through bar 320 penetrating through the first unit 100 and provided to absorb the deformation due to the expansion and contraction of the gas vessel 10.

In the all molding step, when the reinforcing fiber is stacked in the mold or on the foam, the reinforcing fiber may be stacked so that the align direction of the reinforcing fiber of the first unit 100 is vertical to the length direction of the gas vessel 10 and the reinforcing fiber may be stacked so that the align direction of the reinforcing fiber of the second unit 200 is parallel with the length direction of the gas vessel 10.

The align direction of the reinforcing fiber of the first unit 100 is vertical to the length direction of the gas vessel 10 and the align direction of the reinforcing fiber of the second unit 200 is parallel with the length direction of the gas vessel 10, such that the bending strength of the first unit 100 and the second unit 200 may be increased.

Alternatively, in the all molding step, when, the reinforcing fiber is stacked in the mold or on the foam, the reinforcing fiber may be disposed so that a fabric is disposed on the surfaces of the first unit 100 and the second unit 200.

The fabric is disposed on the surfaces configuring the outermost layers of the first unit 100 and the second unit 200 so that when a load is applied to the first unit 100 or the second unit 200, the phenomenon that the first unit 100 and the second, unit 200 are broken depending on the grain of the reinforcing fiber in the length direction may be prevented.

A manufacturing method of an apparatus for fastening a pair of gas vessels 10 according to an exemplary embodiment of the present disclosure may include a partial molding step of molding a second unit 200 extending in a length direction of the gas vessel 10 using a mold or a foam using a reinforcing fiber and a resin, an integral molding step of integrally molding the first units 100 and the second unit 200 by simultaneously molding the plurality of first units 100 spaced apart from each other in parallel with each other in a length direction of the gas vessel 10 using the mold or the foam using the reinforcing fiber and the resin and disposing the second unit 200 in the mold; and a fastening step of fastening the gas vessel 10 to the first unit 100 after the pair of gas vessels 10 are seated on the first units 100.

Unlike the exemplary embodiments of the present disclosure as described above, the second unit 200 is first molded by the partial molding step, and then the second unit 200 is disposed in the mold for the molding of the plurality of first units 100 by the integral molding step, thereby completing the integral molding of the first unit 100 and the second unit 200. When the first unit 100 and the second unit 200 are coupled with each other by the integral molding, the use of the adhesive is unnecessary and the load larger than the case in which the first unit 100 and the second unit 200 are connected to each other by the adhesive may be borne.

Next, similarly, the manufacturing method of an apparatus for fastening a gas vessel 10 is completed by seating the pair of gas vessels 10 on the first unit 100 and then fastening the gas vessel 10 to the first unit 100.

As described above, according to the apparatus for fastening a gas vessel in accordance with the exemplary embodiments of the present disclosure, the plurality of first units and the second unit connecting therebetween are formed in the integrated frame structure, and thus may be attached and detached as one module, thereby expecting the effect of improving the workability.

Further, the upper portion of the first unit may serve to receive the gas vessel and absorb the deformation of the gas vessel and the lower portion thereof may serve to bear the bending load.

According to the exemplary embodiments of the present disclosure, it is possible to efficiently use a lower space of the apparatus for fastening a gas vessel when the apparatus for fastening a gas vessel is applied to the vehicle due to the simple structure thereof and facilitate repair and maintenance thereof.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. An apparatus for fastening a pair of gas vessels, the apparatus comprising:
   the pair of gas vessels;
   a plurality of first units formed of a composite material and spaced apart from each other in parallel with each other in a length direction of the gas vessels, the plurality of first units having the pair of gas vessels seated on both sides thereof;
   a second unit formed of a composite material and extending in the length direction of the pair of gas vessels to integrally connect the plurality of first units that are spaced apart from each other; and
   a plurality of fastening units, each of which extending along a circumference of the pair of gas vessel to enclose the pair of gas vessels seated on the plurality of first units and have both ends connected to the plurality of first units.

2. The apparatus of claim 1, wherein each of the plurality of first units is divided into a receiving part in which the pair of gas vessels are seated on both sides thereof and a support part which supports the receiving part at a lower portion of the receiving part, and
   wherein a closed curve is formed between the receiving part and the support part.

3. The apparatus of claim 2, wherein the second unit is fastened between the receiving part and the support part to bisect the closed curve.

4. The apparatus of claim 2, wherein a thickness of the support part is thicker than that of the receiving part, or a stiffness of a reinforcing fiber forming the support part is higher than that of a reinforcing fiber forming the receiving part.

5. The apparatus of claim 1, wherein each of the plurality of first units includes:
   a pair of receiving regions located at both sides of each of the plurality of first units and having the pair of gas vessels seated on each thereof to enclose lower portions of the gas vessels;
   a connection region located between the pair of receiving regions;
   a pair of protruding regions protruding outwardly from each of the receiving regions;
   a pair of descending regions extending downwardly from each of the protruding regions; and
   a support region extending to connect one side of the descending region and another side of the descending region.

6. The apparatus of claim 5, wherein the receiving regions are spaced upwardly from the support region.

7. The apparatus of claim 5, wherein a central part of the support region located under the connection region protrudes upwardly toward the connection region.

8. The apparatus of claim 5, wherein the second unit is fastened between the support region and the connection region to connect the plurality of first units.

9. The apparatus of claim 8, wherein one end of each of the plurality of fastening units penetrates through the pair of protruding regions, and
   wherein the support region and another end of each of the plurality of fastening units penetrates through the connection region, the second unit, and the support region.

10. The apparatus of claim 5, wherein a center of both side portions of the support region located under the pair of receiving regions protrudes upwardly so that a cross sectional shape of the support region is bent.

11. The apparatus of claim 5, wherein the pair of protruding regions are connected to a vehicle body and an insertion plate is inserted into the protruding regions.

12. The apparatus of claim 1, wherein each of the plurality of fastening units includes:
   a fastening band extending along the circumference of each of the gas vessels to enclose an upper portion of the gas vessel;
   a through bar disposed at both ends of the fastening band and penetrating through the first unit; and
   an absorbing part formed at an end of the through bar and absorbing a deformation due to an expansion and contraction of the gas vessels.

13. The apparatus of claim 12, wherein the absorbing part includes:
   a spring member inserted into the through bar; and
   a fastening member fastened to the end of the through bar.

14. The apparatus of claim 13, wherein the absorbing part further includes:
   a washer inserted into the through bar to be disposed at an upper portion or a lower portion of the spring member.

15. The apparatus of claim 1, further comprising:
   a first rubber band disposed between the first unit and each of the gas vessels; and a second rubber band disposed between each of the fastening units and each of the gas vessels and enclosing the circumference of each of the gas vessels along with the first rubber band.

16. The apparatus of claim 1, wherein the second unit has a hollow shape so that a cross section of the second unit vertically cut in the length direction of the gas vessels forms a closed cross section.

17. The apparatus of claim 16, wherein the closed cross section of the second unit has a rectangular shape in which a height is longer than a width.

18. A manufacturing method of an apparatus for fastening a pair of gas vessels, the manufacturing method comprising:
   an all molding step of molding a plurality of first units having the pair of gas vessels seated on both sides of the first units using a mold or a foam made of a reinforcing fiber and a resin and molding a second unit which extends in a length direction of the gas vessels;
   a bonding step of integrally connecting the plurality of first units, which are spaced apart from each other in parallel with each other in the length direction of the gas vessels, to the second unit using an adhesive; and
   a fastening step of fastening the gas vessels to the plurality of first units after the pair of gas vessels are seated on the plurality of first units.

19. The manufacturing method of claim 18, wherein in the all molding step, when the reinforcing fiber is stacked in the mold or on the foam, the reinforcing fiber is stacked so that an align direction of the reinforcing fiber of the first units is vertical to the length direction of the gas vessels and the reinforcing fiber is stacked so that an align direction of the reinforcing fiber of the second unit is parallel with the length direction of the gas vessels.

20. The manufacturing method of claim 18, wherein in the all molding step, when the reinforcing fiber is stacked in the mold or on the foam, the reinforcing fiber is disposed so that a fabric is disposed on surfaces of the first units and the second unit.

* * * * *